(12) United States Patent
Law et al.

(10) Patent No.: US 6,929,244 B1
(45) Date of Patent: Aug. 16, 2005

(54) INTERFERENCE-FIT SEAL FOR GATE VALVES

(75) Inventors: Robert K. Law, Houston, TX (US);
Anton J. Dach, Jr., Trinity, TX (US);
David D. Comeaux, Houston, TX (US)

(73) Assignee: Vetco Gray Inc., Houston, TX (US)

( * ) Notice: Subject to any disclaimer, the term of this patent is extended or adjusted under 35 U.S.C. 154(b) by 174 days.

(21) Appl. No.: 10/383,144

(22) Filed: Mar. 6, 2003

Related U.S. Application Data

(60) Provisional application No. 60/363,719, filed on Mar. 12, 2002.

(51) Int. Cl.$^7$ ................................................ F16K 3/02
(52) U.S. Cl. ........................ 251/328; 251/362; 251/365
(58) Field of Search ................................ 251/328, 362, 251/365

(56) References Cited

U.S. PATENT DOCUMENTS

| | | | |
|---|---|---|---|
| 2,869,819 A | 1/1959 | Rucker | |
| 2,925,993 A | 2/1960 | Downs et al. | |
| 2,925,994 A | 2/1960 | Downs et al. | |
| 3,434,692 A | 3/1969 | Tillman, III | |
| 4,116,419 A * | 9/1978 | Diehl et al. | 251/328 |
| 4,192,483 A * | 3/1980 | Combes | 251/172 |
| 4,376,526 A * | 3/1983 | Freeman | 251/328 |
| 4,441,688 A | 4/1984 | Kato | |
| 4,489,918 A | 12/1984 | Kalsi | |
| 4,568,062 A * | 2/1986 | Regitz et al. | 251/328 |
| 4,824,074 A * | 4/1989 | Baugh | 251/328 |
| 5,192,051 A | 3/1993 | Roberson | |
| 5,291,912 A * | 3/1994 | Comeaux | 251/327 |
| 5,370,362 A | 12/1994 | Kent et al. | |

* cited by examiner

*Primary Examiner*—Eric Keasel
(74) *Attorney, Agent, or Firm*—Bracewell & Giuliani LLP

(57) ABSTRACT

A gate valve has seat rings pressed into counterbores to form seals. Each counterbore is located at an intersection of a flow passage with a central cavity of a body of the gate valve. The counterbore has a cylindrical constant diameter sidewall. The seat ring has an outer end that forms a pilot section and is of smaller outer diameter than the inner diameter of the counterbore. The seat ring also has an outer portion that is of equal or larger diameter than the inner portion, defining an interference section. The interference section creates an interference fit with the counterbore, forming a seal.

16 Claims, 2 Drawing Sheets

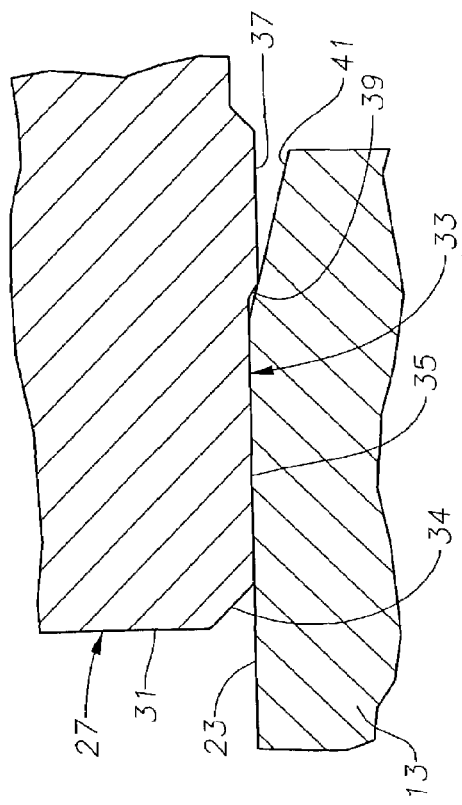
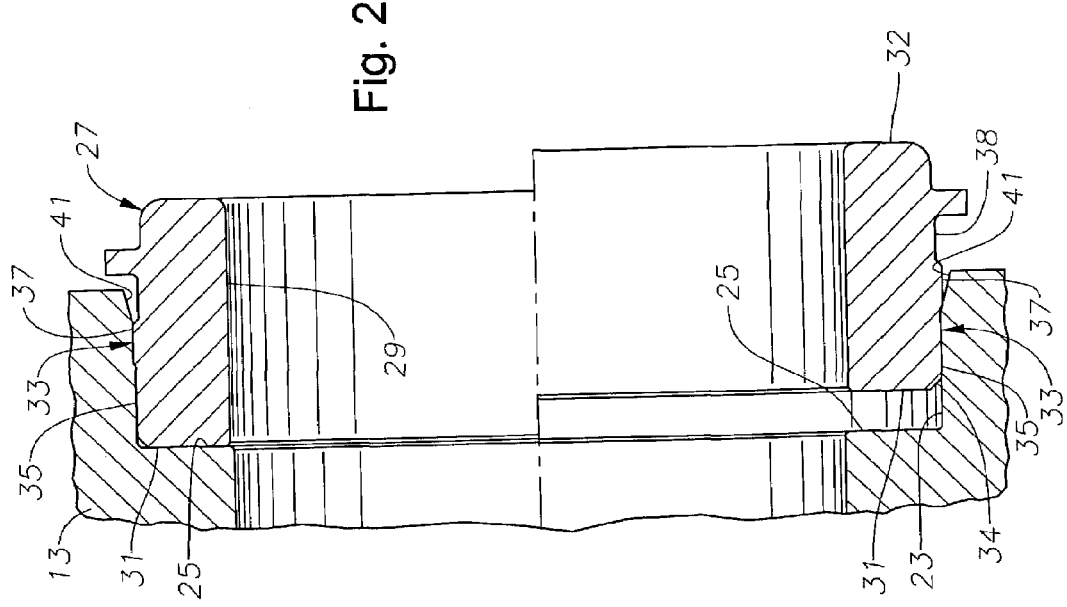

INTERFERENCE-FIT SEAL FOR GATE VALVES

This application claims priority from the provisional application Ser. No. 60/363,719, filed Mar. 12, 2002, entitled "Interference-Fit Seal for Gate Valves".

FIELD OF THE INVENTION

This invention relates in general to gate valves and in particular to the seat rings within the gate valves.

BACKGROUND OF THE INVENTION

Gate valves are used in oil and gas industry for a variety of flow lines. A typical gate valve has a body with a central cavity. The body has two passages that are coaxial and intersect the central cavity. Seat rings are located at the junctions of the flow passages with the central cavity. A gate is moved past the seat rings to either open or close the flow passages.

The gate valves of the type concerned herein are designed so that the downstream gate will form a metal-to-metal seal with the downstream seat ring. The downstream seat ring also has to seal to the counterbore within the body in which it is located. Metal and elastomeric seal rings have been utilized in the past to seal the seat rings in the counterbores. Also, it is known to press seat rings within the counterbores to form an interference fit that is sufficiently tight so as to form a seal.

In high temperature applications, elastomeric seals and some metal seal rings may not be usable. Interference fit sealing will normally withstand high temperatures, however, pressing the seat rings into the counterbores is difficult. It is not easy to maintain alignment and avoid cocking of the seat ring relative to the counterbore.

SUMMARY OF THE INVENTION

In this invention, the interface between the seat ring and the counterbore has two sections, a pilot section and an interference section. The pilot section is cylindrical and provides a slight clearance between the seat ring and the counterbore to facilitate entry of the seat ring into the counterbore. The interference section that provides an interference fit between the seat ring and the counterbore, creating the seal.

Preferably, the interference section is located closer to the valve body cavity than the pilot section. In the preferred embodiment, the counterbore is of a uniform cylindrical diameter. The seat ring has two different diameters, with the pilot section, which is at an outer end of the seat ring, being slightly smaller than the interference section, which extends inward from the pilot section. Both the pilot section and the interference section are cylindrical, resulting in a shoulder at a junction between them. Also, in the embodiment shown, the pilot section is more than twice the length of the interference section. Chamfers are preferably located on the inner end of the seal ring and optionally at the entrance of the counterbore.

BRIEF DESCRIPTION OF DRAWINGS

The novel features believed to be characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 2 is an enlarged cross-sectional view of a seat ring constructed in accordance with the present invention, the upper portion of the figure showing the seat ring in a fully-installed position, the lower portion of the figure showing the seat ring in an intermediate position during installation.

FIG. 3 is a further enlarged cross-sectional view of the lower portion of the seal of FIG. 2 in an intermediate position during installation.

DETAILED DESCRIPTION OF THE INVENTION

Figure 1:
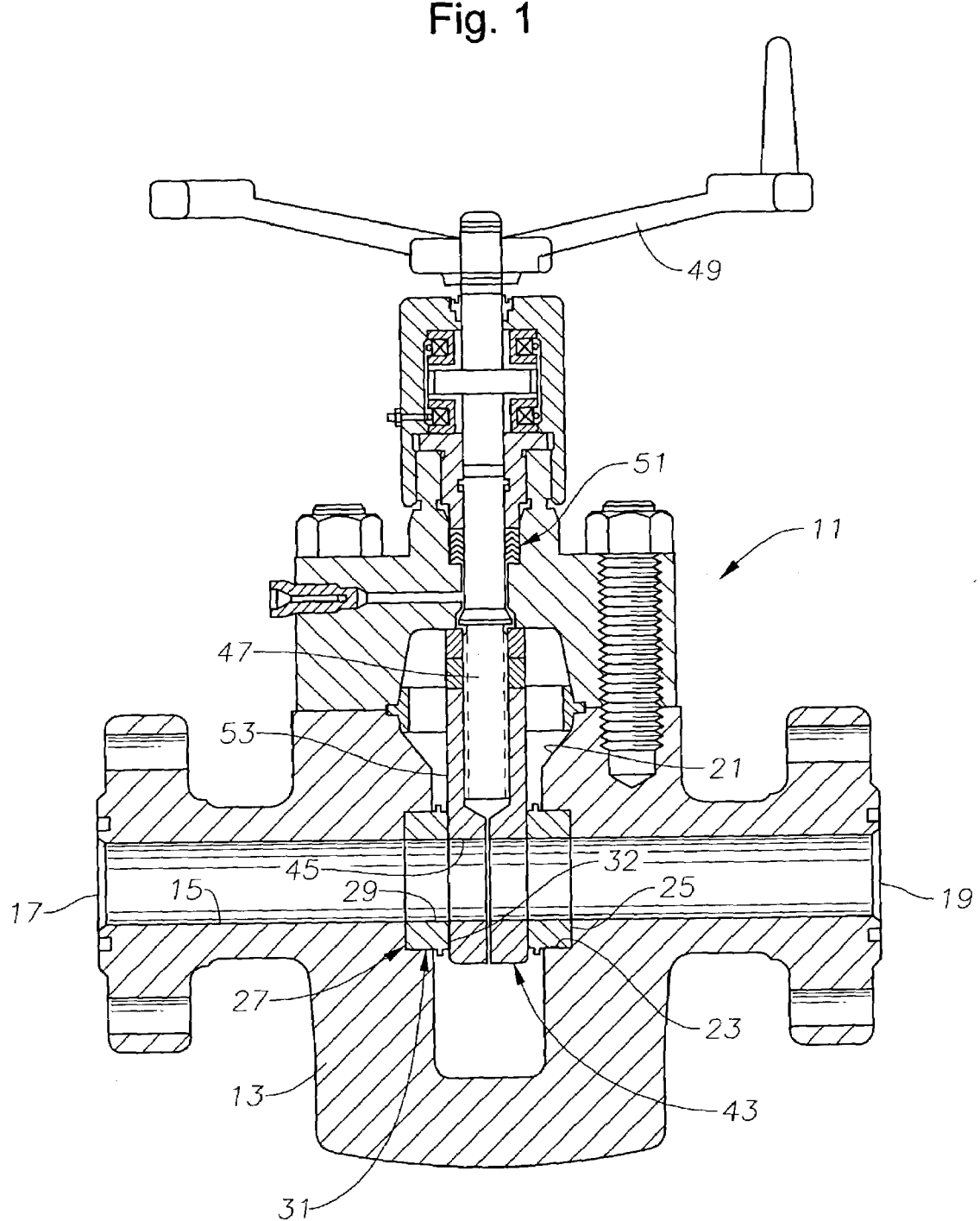
FIG. 1 is a cross-sectional view of a gate valve constructed in accordance with the present invention.

Referring to FIG. 1, valve 11 has a body 13 with a flow passage 15 extending transversely through it. Flow passage 15 has an downstream section 17 and an upstream section 19. The downstream section 17 and upstream section 19 refer to a right to left direction of flow of fluid through valve 11 in normal well flow operations. Downstream section 17 and upstream section 19 may be reversed, with the normal well flow left to right, because the valve is symmetrical.

Flow passage 15 intersects a central cavity or chamber 21 located in body 13, and a counterbore is formed in flow passage 15 at each intersection with chamber 21. The counterbore is concentric with each flow passage 15 and has a cylindrical, counterbore wall 23. Each counterbore has a base or shoulder 25 at its outer end. Counterbore shoulder 25 is perpendicular to the axis of the flow passage 15.

Referring also to FIGS. 2 and 3, a seat ring 27 locates in each counterbore. Each seat ring 27 is a cylindrical, tubular member having a passage 29 extending through it, passage 29 having a diameter that is substantially equal to the diameter of passage 15 of body 13. Each seat ring 27 has an outwardly-facing end 31 that abuts shoulder 25 when seat ring 27 is in the installed position, shown in the upper portion of FIG. 2. An inwardly-facing face 32 is located on the inner end of seat ring 27. A chamfer 34 is formed at the circumference of outer end 31.

The outer cylindrical surface 33 of seat ring 27 comprises a pilot section 35, an interference or seal band section 37, and a relieved section 38. Pilot section 35 is on the outer end portion of surface 33 and is cylindrical with a diameter slightly smaller than the diameter of counterbore wall 23. The difference in diameters is about 0.005 to 0.006 inch. Interference section 37 is a cylindrical band that has a diameter about 0.005 to 0.010 inch greater than pilot section 35. The diameter of interference section 37 is substantially the same as or a few thousandths of an inch larger than the diameter of counterbore wall 23, preferably from 0.001 to 0.005 inch. The tolerances of interference section 37 are selected so that its diameter is not less than the diameter of counterbore wall so as to create an interference fit. Interference section 37 extends inward from pilot section 35. Shoulder 39 (FIG. 3) serves as a transition between pilot section 35 and interference section 37.

A chamfer 41 is formed in the inner opening of counterbore wall 23, chamfer 41 being located inward of interference section 37 once seat ring 27 is fully installed. Interference section 37 has an axial extent less than the axial extent of pilot section 35 and is positioned so that it will be fully within counterbore wall 23 once installed. The inner end of interference section 37 terminates approximately at the edge of counterbore chamfer 41 when seat ring 27 is fully installed. In a preferred embodiment, the axial length of pilot section 35, measured from the inner edge of chamfer 34 to shoulder 39 is about 1.92 times the axial length of interference section 37 from shoulder 39 to recessed section 38. The axial length of pilot section 35, measured from seat ring outer end 13 to shoulder 39, is about 2.24 times the axial length of interference section 37. These ratios may vary.

Referring again to FIG. 1, valve 11 has a gate 43 in the embodiment shown. Gate 43 is split into two slabs in this embodiment, each slab having a hole 45 extending through it that registers with flow passage 15 when gate 43 is in the open position. A stem 47, when rotated, will cause gate 43 to move between the open position and a closed position, in which gate 43 is moved downward to block passage 15. A handle 49 is employed in this embodiment for rotating the stem 47 although other types of actuators could be used. A conventional packing assembly 51 provides sealing for stem 47. Outer surfaces 53 of gate 43 slidingly engage faces 32 of seat rings 27.

Referring again to FIGS. 2 and 3, to install a seat ring 27 in a counterbore, the axis of seat ring 27 is aligned with the axis of the counterbore before pilot section 35 is inserted into the counterbore, as shown in the lower portion of FIG. 2. Seat ring 27 can easily be inserted into the counterbore until shoulder 39 contacts the intersection of chamfer 41 and counterbore wall 23. FIG. 3 is an enlarged view of seat ring 27 in this intermediate position during installation.

Because the outer diameter of interference section 37 is equal or larger than the inner diameter of counterbore wall 23, a hydraulic press or other means is used to apply outward force to face 32, moving seat ring 27 to the fully-seated position, as shown in the upper portion of FIG. 2. Seat ring 27 is moved outwardly until outer end 31 of seat ring 27 abuts shoulder 25 of the counterbore. The interference fit between wall 23 and interference portion 37 retains seat ring 27 and seals between seat ring 27 and counterbore wall 23.

Referring to the figures, in operation, handle 49 is rotated to move gate 43 to a position relative to passages 15, 29 that allows a desired amount of fluid flow through valve 11. When in the fully-open position, as in FIG. 1, fluid flows through upstream section 19, through the upstream seat ring 27, through holes 45 in the slabs of gate 43, then through the downstream seat ring 27 and downstream section 17. Although not recommended during flowing conditions, gate 43 may also be moved to a partially-closed position, in which holes 45 are not concentric with passages 29 but are partially open to allow some fluid flow through valve 11.

When gate 43 is moved to the lower or fully-closed position (not shown), the downstream hole 45 is sealed from passages 29, preventing fluid flow through valve 11. The downstream surface 53 of gate 43 is in sealing engagement with face 32 of the downstream seat ring 27, and fluid is prevented from moving downstream from upstream section 19. Because gate 43 is split, it will seal in either direction, whether the flow is from the left or from the right.

The invention has significant advantages over other common, metal, interference-type seat rings. The seat ring of the invention provides for reliable, gas-tight metal sealing between the gate and the seat rings and between the seat rings and the valve body, making the valve capable for use in high-temperature (approximately 650° F.) applications.

During installation, the pilot section decreases the chance of misalignment of the seat rings under the pressing loads, significantly reducing assembly errors and improving the capability of leak-tight seat-to-gate sealing in a low-pressure gas test. The pilot section also reduces the amount of travel from the intermediate position to the fully-seated position, minimizing the area of potential surface marring created by the loads required to seat the seat ring. Additionally, the seat ring is more easily removed, making the rework of the body more viable. These two design benefits are advantageous in keeping rework to a minimum during routine aftermarket refurbishment.

The seat ring is sized to provide resistance to movement in the counterbore that is sufficient to withstand expected pressures acting on the backside of the seat ring. This seat-ring design provides for stability of the seat ring in the counterbore that is superior to current gate valves using metal-sealing-type seat rings. This benefit will provide for superior, low-pressure seal repeatability and lower torque, as well as fewer occurrences of gate-to-seat-interface cycling damage.

Other designs of valves with pressed-in seats can only operate in a uni-directional flow because of the gate design. The combination of the new seat design and split-gate design provides a metal-sealing, as well as bi-directional sealing, high-temperature gate valve, which is highly tolerant to corrosive media flowing through it.

While the invention has been shown in only one of its forms, it should be apparent to those skilled in the art that it is not so limited, but is susceptible to various changes without departing from the scope of the invention.

We claim:

1. A gate valve, comprising:
 a body having a flow passage that intersects a central cavity;
 a counterbore formed at each intersection of the flow passage with the central cavity, the counterbore having an interior cylindrical wall surface;
 a seat ring located within and forming an interface with the cylindrical wall surface of the counterbore;
 the interface having a pilot section that defines a slight cylindrical clearance between the seat ring and the cylindrical wall surface of the counterbore to facilitate entry of the seat ring into the counterbore;
 the interface having an interference section that defines an interference fit between the seat ring and the same cylindrical wall surface of the counterbore, creating a seal; and
 a gate that moves within the cavity in sliding contact with inner faces of the seat rings between open and closed positions.

2. The gate valve according to claim 1, wherein the pilot section and the interference section join each other.

3. The gate valve according to claim 1, further comprising a stationary shoulder located at a junction of the pilot section and the interference section.

4. The gate valve according to claim 1, wherein the interference and pilot sections are positioned along an axis of the seat ring so that during insertion of the seat ring into the counterbore, the pilot section of the interface is fully engaged prior to any engagement of the interference section.

5. The gate valve according to claim 1, wherein the interference section has a diameter that differs only slightly from the diameter of the pilot section.

6. The gate valve according to claim 1, wherein the gate has two separate slabs.

7. The gate valve according to claim 1, wherein the interference section has an axial length, measured along an axis of the seat ring, that is less than an axial length of the pilot section.

8. In a gate valve having a body having a coaxial flow passage that intersects a central cavity, a counterbore formed at each intersection of the flow passage with the central cavity, a seat ring located within each of the counterbores, and at least one gate that moves within the cavity in sliding contact with the seat rings between open and closed positions, the seat rings comprising:

a cylindrical pilot section on an exterior of each of the seat rings and extending in an inward direction from an outer end portion of each of the seat rings, each of the pilot sections having an outer diameter smaller than an inner diameter of each of the counterbores to facilitate entry of the seat rings into the counterbores; and an interference section on the exterior of each of the seat rings that has an outer diameter at least equal to the inner diameter of each of the counterbores, the interference sections engaging the counterbores in interference fits.

9. The gate valve according to claim 8, wherein the pilot section and the interference section of each of the seat rings join each other.

10. The gate valve according to claim 8, further comprising a shoulder located at a junction of the pilot section and the interference section of each of the seat rings.

11. The gate valve according to claim 8, further comprising a chamfer located at a junction of the inner end and the pilot section of each of the seat rings.

12. The gate valve according to claim 8, wherein the interference section is cylindrical.

13. The gate valve according to claim 8, further comprising a chamfer located at an entrance of each of the counterbores.

14. A gate valve, comprising:
a body having a coaxial flow passages that intersects a central cavity;

a counterbore formed at an intersection of each of the flow passages with the central cavity, each of the counterbores having an outer end with a shoulder formed therein and an interior sidewall of constant inner diameter extending to the shoulder;

a pair of seat rings, each of the seat rings having an inner face and an outer end that abuts the shoulder in one of the counterbores;

an annular chamfer formed on an outer end of each of the seat rings;

a pilot section extending inward from the chamfer on each of the seat rings, each of the pilot sections having a constant outer diameter that is less than the inner diameter of each of the sidewalls of the counterbores to facilitate entry of the seat rings into the counterbores;

an interference section extending inward from the pilot section on each of the seat rings, each of the interference sections having a constant outer diameter that engages one of the counterbores in interference fit to create a seal; and a gate that moves within the cavity in sliding contact with the faces of the seat rings between open and closed positions.

15. The gate valve according to claim 14, further comprising a shoulder located at a junction of the pilot section and the interference section of each of the seat rings.

16. The gate valve according to claim 14, wherein the gate is split to provide bi-directional sealing with the seat rings.

* * * * *